United States Patent
Taniguchi et al.

(10) Patent No.: US 8,115,809 B2
(45) Date of Patent: Feb. 14, 2012

(54) VEHICLE SURROUNDINGS MONITORING APPARATUS

(75) Inventors: Fuminori Taniguchi, Shioya-gun (JP); Hiroshi Hattori, Utsunomiya (JP); Hideki Hashimoto, Utsunomiya (JP); Nobuharu Nagaoka, Nasukarasuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 1820 days.

(21) Appl. No.: 11/287,868

(22) Filed: Nov. 28, 2005

(65) Prior Publication Data

US 2006/0115120 A1    Jun. 1, 2006

(30) Foreign Application Priority Data

Nov. 30, 2004   (JP) ................................. 2004-347822

(51) Int. Cl.
*H04N 7/18*    (2006.01)
*H04N 5/232*   (2006.01)

(52) U.S. Cl. ...................... 348/148; 348/155; 348/211.8

(58) Field of Classification Search .................. 348/148, 348/180, 184, 185, 187, 189, 207.99, 207.1, 348/207.11, 208.16
See application file for complete search history.

(56) References Cited

U.S. PATENT DOCUMENTS

| | | | | |
|---|---|---|---|---|
| 4,917,293 A * | 4/1990 | Fedter et al. | ................. | 236/49.3 |
| 5,544,929 A | 8/1996 | Nagai | | |
| 7,119,674 B2 * | 10/2006 | Sefton | ........................... | 340/521 |
| 2001/0005807 A1 * | 6/2001 | Kitajima et al. | .............. | 701/112 |
| 2003/0123205 A1 | 7/2003 | Ashiya | | |
| 2004/0089005 A1 * | 5/2004 | Ichishi et al. | ................... | 62/214 |
| 2004/0225424 A1 * | 11/2004 | Yamamura et al. | ............. | 701/36 |
| 2005/0121185 A1 * | 6/2005 | Yonekura et al. | ............. | 165/202 |

FOREIGN PATENT DOCUMENTS

| | | |
|---|---|---|
| JP | 08-276731 | 10/1996 |
| JP | 8-313632 | 11/1996 |
| JP | 11-328364 | 11/1999 |
| JP | 2000-030197 | 1/2000 |
| JP | 2001-6096 | 1/2001 |
| JP | 2001-088609 | 4/2001 |
| JP | 2001088609 A * | 4/2001 |
| JP | 2001-211449 | 8/2001 |
| JP | 2001-213240 | 8/2001 |
| JP | 2001-351200 | 12/2001 |
| JP | 2002-354463 | 12/2002 |
| JP | 2003-189460 | 7/2003 |
| JP | 2003-216937 | 7/2003 |

* cited by examiner

*Primary Examiner* — Thierry Pham

(74) *Attorney, Agent, or Firm* — Carrier Blackman & Associates, P.C.; William D. Blackman; Joseph P. Carrier

(57) ABSTRACT

A vehicle surroundings monitoring apparatus which includes: an imaging device that captures a surroundings of a vehicle; a temperature measuring device that measures a temperature of the imaging device; and an OFF signal output device that outputs a command signal to set a power supply of the imaging device to the OFF state in accordance with the temperature of the imaging device measured by the temperature measuring device.

2 Claims, 4 Drawing Sheets

VEHICLE SURROUNDINGS MONITORING APPARATUS

BACKGROUND OF THE INVENTION

1. Field of the Invention

The present invention relates to a vehicle surroundings monitoring apparatus that performs object extraction with images taken by an imaging apparatus that can capture for example in the visible light region or infrared region.

Priority is claimed on Japanese Patent Application No. 2004-347822, filed Nov. 30, 2004, the content of which is incorporated herein by reference.

2. Description of Related Art

There is conventionally known a vehicle surroundings monitoring apparatus in which an object such as a pedestrian with a possibility of colliding with an automobile is extracted from an infrared image of the automobile's surroundings captured by an infrared camera, and information of this object is provided to the driver (for example, see Japanese Unexamined Patent Application, First Publication No. 2001-6096).

In the vehicle surroundings monitoring apparatus according to one example of the aforementioned conventional art, in accordance with the position that an infrared camera is mounted on the vehicle, the temperature of the infrared camera may become excessively high depending on the operation state of the vehicle. For example, when an infrared camera is disposed at the front of the vehicle, in the operation state of the infrared camera the temperature of the infrared camera may exceed the specified durability upper limit due to the radiant heat of the internal combustion engine, causing a malfunction such as an abnormality in the infrared camera.

SUMMARY OF THE INVENTION

The present invention was made in view of the above-mentioned circumstances, and has as its object providing a vehicle surroundings monitoring apparatus capable of properly operating an imaging apparatus mounted on a vehicle while preventing the imaging apparatus from entering an abnormal state in a high temperature state exceeding a specified temperature.

In order to attain the object that solves the above-mentioned problem, the present invention provides a vehicle surroundings monitoring apparatus including: an imaging device that captures a surroundings of a vehicle; a temperature measuring device that measures a temperature of the imaging device; and an OFF signal output device that outputs a command signal to set a power supply of the imaging device to the OFF state in accordance with the temperature of the imaging device measured by the temperature measuring device.

The above-mentioned vehicle surroundings monitoring apparatus, by being equipped with a temperature measuring device that measures the temperature of the imaging device, can accurately measure the temperature state of the imaging device, and so can protect the imaging device by appropriately controlling the power supply of the imaging device.

The vehicle surroundings monitoring apparatus of the present invention may further include: a reset determining device that determines whether or not a state of the imaging device is a specified resettable state; and a restart device that restarts the imaging device with the power supply set to the OFF state when the state of the imaging device is determined to be a specified resettable state by the reset determining device.

In this case, by determining whether or not the state of the imaging device is a specified resettable state, the imaging device can be restarted while being protected by appropriately controlling the power supply of the imaging device.

The vehicle surroundings monitoring apparatus of the present invention may further include an elapsed time measuring device that measures an elapsed time from a moment the command signal is output by the OFF signal output device, the reset determining device determining whether or not the state of the imaging device is a specified resettable state based on the elapsed time measured by the elapsed time measuring device.

In this case, by determining whether or not the elapsed time after the command signal to turn the power supply OFF is output is a specified time, the imaging device can be restarted while being protected by appropriately controlling the power supply of the imaging device in accordance with the time variation of the temperature state of the imaging device.

The vehicle surroundings monitoring apparatus of the present invention may further include a vehicle speed measuring device that measures a speed of the vehicle, the reset determining device determining whether or not the state of the imaging device is a specified resettable state based on the speed of the vehicle measured by the vehicle speed measuring device.

In this case, after the command signal to turn the power supply OFF is output, by determining whether or not the vehicle speed is not less than a specified speed, the imaging device can be restarted while being protected by appropriately controlling the power supply of the imaging device in accordance with the speed state of the imaging device.

The vehicle surroundings monitoring apparatus of the present invention may further include a vehicle temperature state measuring device that measures a temperature state of the vehicle, the reset determining device determining whether or not the state of the imaging device is a specified resettable state based on the temperature state of the vehicle measured by the vehicle temperature state measuring device.

In this case, after the command signal to turn the power supply OFF is output, the imaging device can be restarted while being protected by appropriately controlling the power supply of the imaging device in accordance with the temperature state of the vehicle according to the temperature of the imaging device.

DETAILED DESCRIPTION OF THE INVENTION

Hereunder, a vehicle surroundings monitoring apparatus according to one embodiment of the present invention is described with reference to the drawings.

Figure 1:
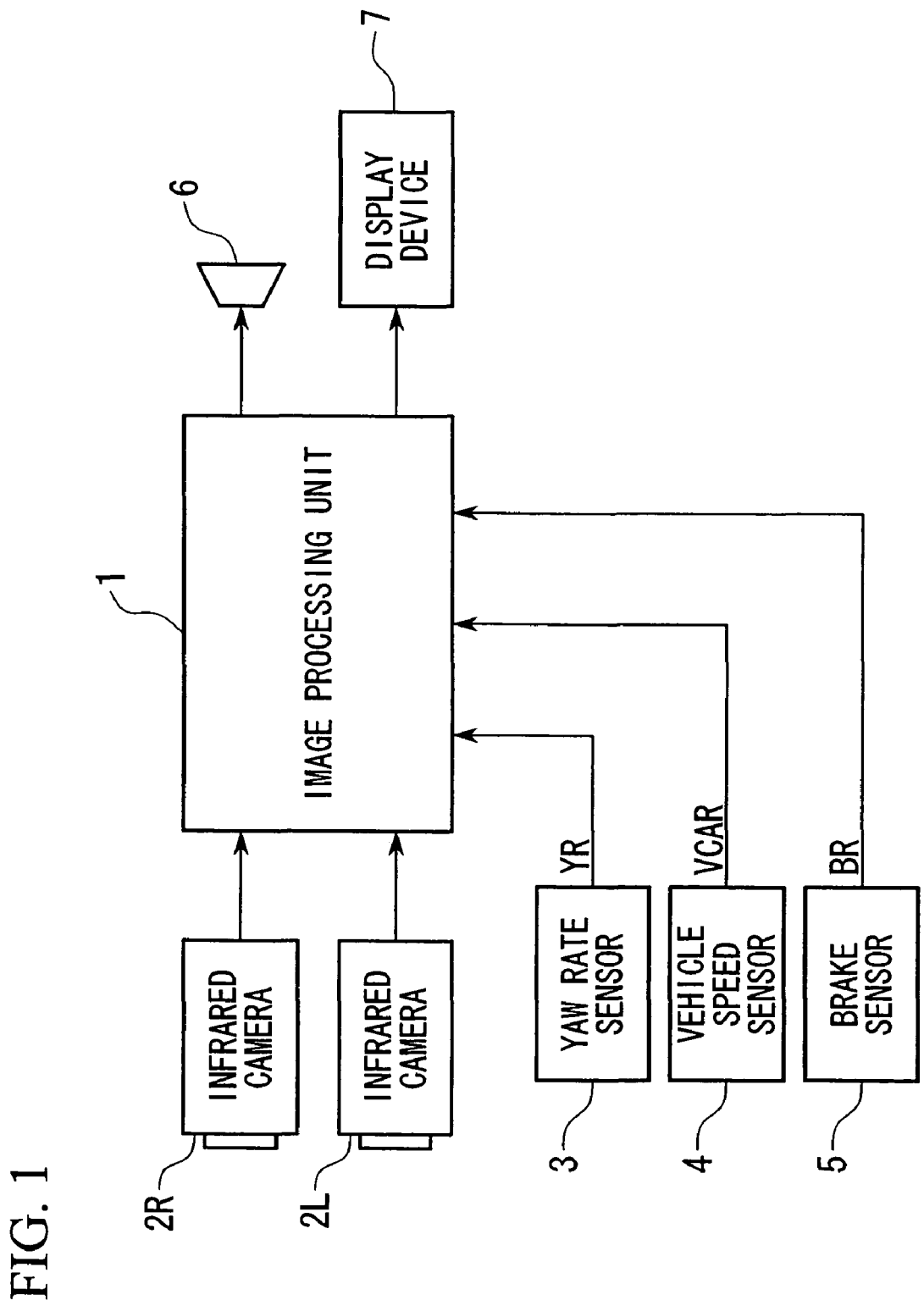
FIG. 1 is a block diagram showing the constitution of the vehicle surroundings monitoring apparatus according to an embodiment of the present invention.

The vehicle surroundings monitoring apparatus according to the present embodiment, for example as shown in FIG. 1, includes: an image processing unit 1 equipped with a CPU (Central Processing Unit) that controls the vehicle surroundings monitoring apparatus; two infrared cameras 2R and 2L that are capable of detecting distant infrared radiation; a yaw rate sensor 3 that detects the yaw rate of the vehicle; a vehicle speed sensor 4 that measures the traveling speed of the vehicle; a brake sensor 5 that detects a driver's braking operation; a loudspeaker 6; and a display device 7. For example, the image processing unit 1 detects a moving object such as a pedestrian or an animal in front of the vehicle in its traveling direction from infrared images of the vehicle surroundings that are captured by the two infrared cameras 2R and 2L, and from detection signals relating to the traveling status of the vehicle that are detected by each of the sensors 3, 4, and 5. In the case where the possibility of a collision between the detected moving object and the vehicle is determined, a warning is output via the loudspeaker 6 or the display device 7.

Moreover, the display device 7 is, for example, constructed including a display device integrated with gauges that display various traveling states of the vehicle, a display device such as a navigation device, and furthermore an HUD (Head Up Display) 7a that displays various information at a position on the front window where the field of front vision of the driver is not impaired.

In addition, the image processing unit 1 includes an A/D converter, that converts input analog signals into digital signals, an image memory that stores digitized image signals (luminance values), a CPU (central processing unit) that performs various arithmetic processing, a RAM (Random Access Memory) that is used for storing data in the middle of the arithmetic processing, a ROM (Read Only Memory) that stores programs that are performed by the CPU and tables, maps and the like, and an output circuit that outputs drive signals for the loudspeaker 6 and display signals for the HUD 7a. The image processing unit 1 is constructed such that the output signals of the infrared cameras 2R and 2L, and the respective sensors, 3, 4, and 5 are input into the CPU after being converted into digital signals.

Figure 2:
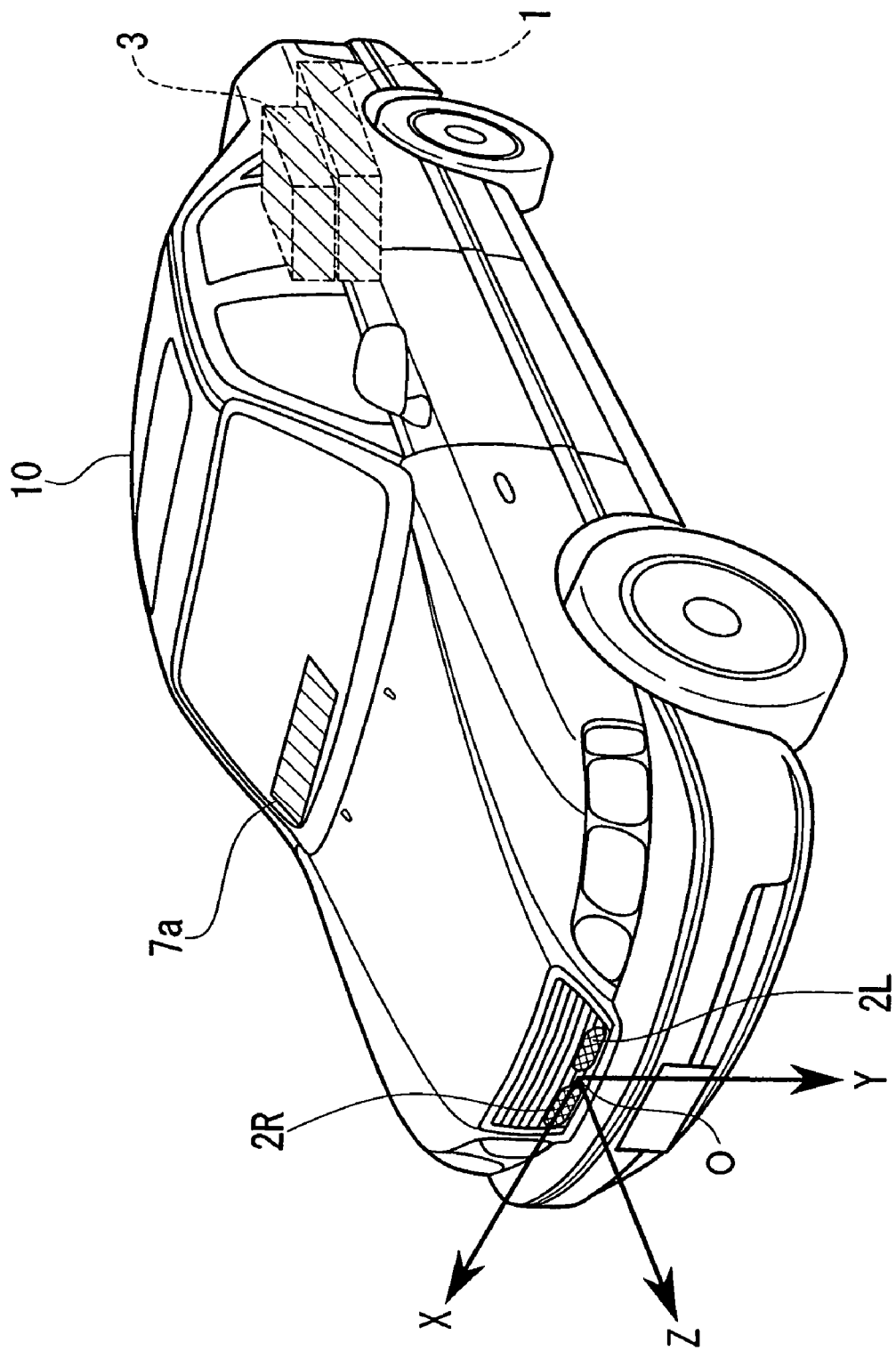
FIG. 2 is a diagram showing a vehicle equipped with the vehicle surroundings monitoring apparatus shown in FIG. 1.

Furthermore, as shown in FIG. 2, two infrared cameras 2R and 2L are disposed at the front of the vehicle 10 at positions symmetrical in the width direction relative to the central axis of the vehicle 10. The optical axes of both cameras 2R and 2L are parallel to each other, and both infrared cameras 2R and 2L are secured at the same height from the road surface. A characteristic of the infrared cameras 2R and 2L is that the output signal level (that is, luminance) increases as the temperature of the object increases.

Moreover, the HUD 7a is provided so as to display the images at a position on the front window of the vehicle 10, where the field of front vision of the driver is not impaired.

Figure 3:
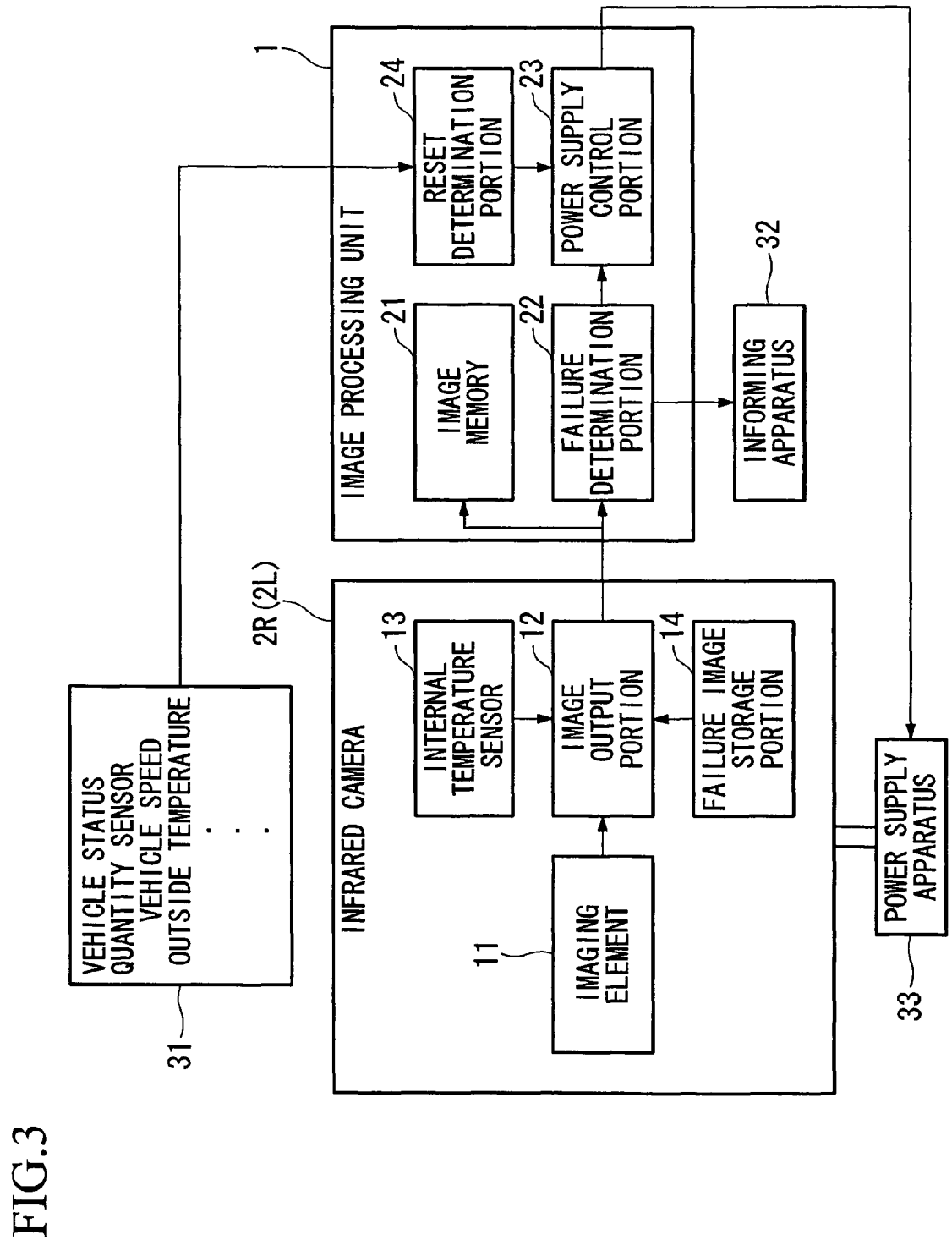
FIG. 3 is a lineblock diagram of the image processing unit shown in FIG. 1.

As shown for example in FIG. 3, the infrared cameras 2R and 2L each include a CCD or CMOS imaging element 11, an image output portion 12, an internal temperature sensor 13 that measures the temperature inside a camera, and a failure image storage portion 14 that stores a specified failure image.

When the temperature inside the camera measured by the internal temperature sensor 13 is not above a specified temperature, the image output portion 12 outputs an infrared image obtained by image pick-up of the imaging element 11 to the image processing unit 1. When the temperature inside the camera measured by the internal temperature sensor 13 is not below a specified temperature, the specified failure image stored in the failure image storage portion 14, instead of the infrared image obtained by image pick-up of the imaging element 11, is output to the image processing unit 1.

As shown for example in FIG. 3, the image processing unit 1 includes an image memory 21, a failure determination portion 22, a power supply control portion 23, and a reset determination portion 24. The reset determination portion 24 in particular is equipped with an outside air temperature sensor and various temperature sensors mounted on the vehicle, in addition to a yaw rate sensor 3, a vehicle speed sensor 4 and a brake sensor 5. The detection signal output from the vehicle status quantity sensor 31 that detects various kinds of vehicle status quantities is input, and an informing apparatus 32 that has a loudspeaker 6 and a display apparatus 7 is connected to the failure determination portion 22 of the image processing unit 1.

In this image processing unit 1, the image memory 11 stores infrared images received from the infrared camera 2R (or 2L) as digital data.

The failure determination portion 22 determines whether or not the specified failure image has been output from the infrared camera 2R (or 2L). When this determination result is "YES", as an alarm informing that the supply of electrical power will be halted by the power supply apparatus 33 because, for example, the infrared camera 2R (or 2L) is in an excessively high temperature state, an audible warning such as an alarm sound or alarm voice via the loudspeaker 6 or a visual warning such as a display via the display apparatus 7 is output from the informing apparatus 32, and the power supply from the power supply apparatus 33 to the infrared camera 2R (or 2L) is stopped via the power supply control portion 23.

When a specified state is detected in the state of the power supply from the power supply apparatus 33 to the infrared camera 2R (or 2L) being stopped, the reset determination portion 24 resumes power supply from the power supply apparatus 33 to the infrared camera 2R (or 2L) via the power supply control portion 23.

As this specified state is the state in which the infrared camera 2R (or 2L) is presumed to have cooled due to a specified time (for example, 30 sec.) having elapsed from the moment the power supply to the infrared camera 2R (or 2L) is stopped, and, for example, the vehicle speed V measured by the vehicle speed sensor 4 being not less than a specified speed (for example, 30 km/h), as well as the outside temperature measured by the outside temperature sensor being not more than a specified temperature.

The vehicle surroundings monitoring apparatus according to the present embodiment is provided with the construction described above. Next, the operation of the vehicle surroundings monitoring apparatus, in particular the processing that controls the power supply for the infrared camera 2R (or 2L), is described with reference to the drawings.

Figure 4:
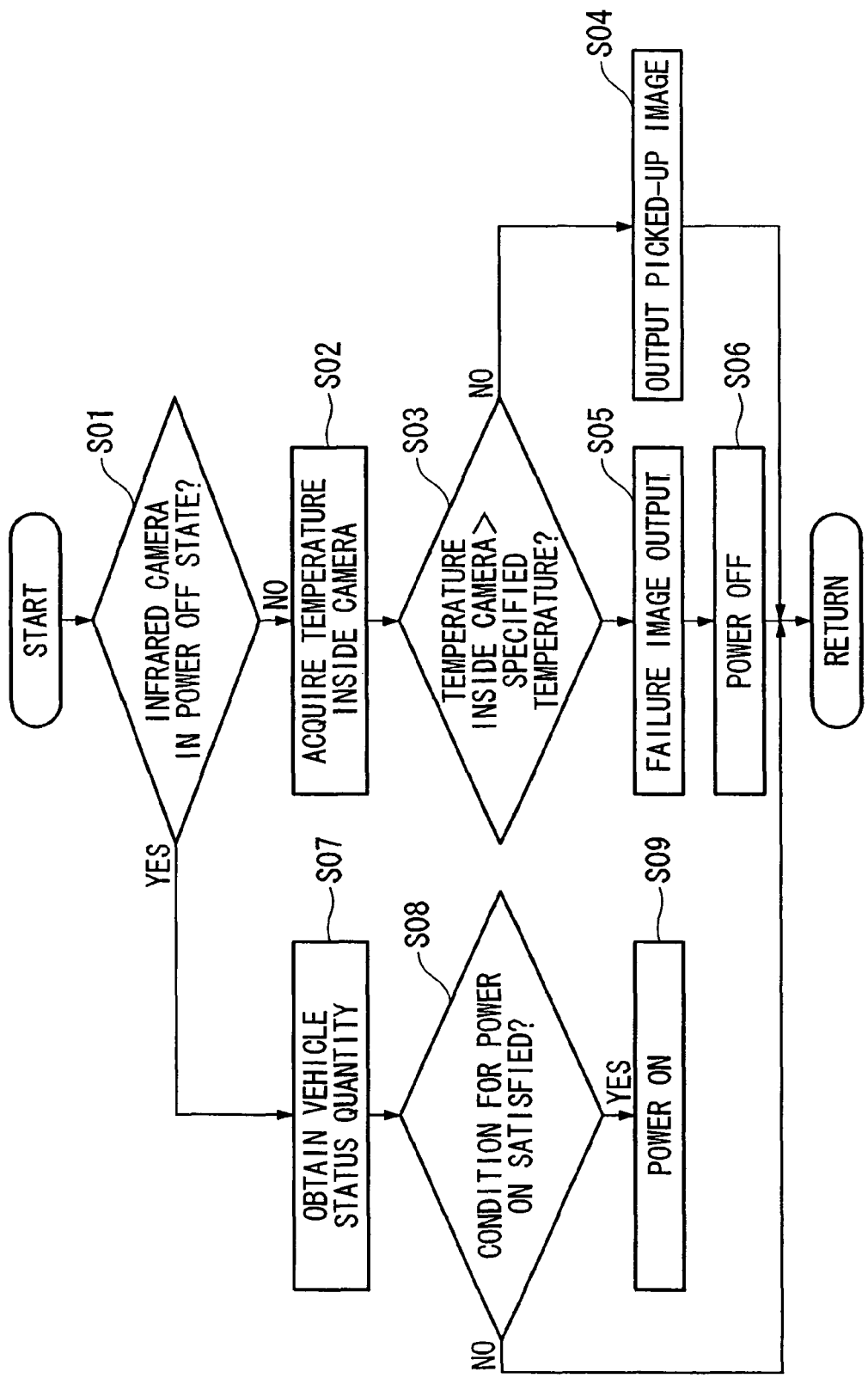
FIG. 4 is a flowchart showing the operation of the image processing unit shown in FIG. 1, particularly the process of controlling the electrical power supply for an infrared camera.

First of all, in step S01 shown in FIG. 4, it is determined whether or not the power supply from the power supply apparatus 33 to the infrared camera 2R (or 2L) is in a stopped state.

When the determination result is "YES", the flow proceeds to step S07 that is described later.

On the other hand, when the determination result is "NO", the flow proceeds to step S02.

In step S02, the temperature inside the camera measured by the internal temperature sensor 13 is acquired.

Next, in step S03, it is determined whether or not the temperature inside the camera is higher than a specified temperature.

When the determination result of step S03 is "NO", the flow proceeds to step S04. In this step S04, the infrared image obtained by image pick-up of the imaging element 11 is output to the image processing unit 1, and the processing is terminated.

On the other hand, when the determination result of step S03 is "YES", the flow proceeds to step S05.

In step S05, the specified failure image stored in the failure image storage portion 14, instead of the infrared image obtained by image pick-up of the imaging element 11, is output to the image processing unit 1.

In step S06, the failure determination portion 22 of the image processing unit 1 determines that the specified failure image has been output from the infrared camera 2R (or 2L), the power supply from the power supply apparatus 33 to the infrared camera 2R (or 2L) is stopped by the power supply control portion 23 of the image processing unit 1, and the processing is terminated.

In step S07, vehicle status quantities such as the outside temperature measured by the outside temperature sensor and the vehicle speed measured by the vehicle speed sensor 4 are acquired.

In step S08, it is determined whether or not a specified status has been detected based on the acquired vehicle status quantities.

When the determination result is "NO", the processing is terminated.

On the other hand, when the determination result is "YES", the flow proceeds to step S09. In this step S09, the power supply from the power supply apparatus 33 to the infrared camera 2R (or 2L) is started by the power supply control portion 23 of the image processing unit 1, and the processing is terminated.

As described above, the vehicle surroundings monitoring apparatus according to the present embodiment, by being equipped with an internal temperature sensors 13 that measures the temperature of the infrared cameras 2R and 2L, can accurately measure the temperature state of the infrared cameras 2R and 2L, and so can protect the infrared cameras 2R and 2L by appropriately controlling the power supply apparatus 33 that is the power supply of the infrared cameras 2R and 2L.

Also, when restarting the infrared cameras 2R and 2L, by determining whether or not the state of the infrared cameras 2R and 2L is a specified resettable state, the infrared cameras 2R and 2L can be restarted while being protected by appropriately controlling the power supply apparatus 33 that is the power supply of the infrared cameras 2R and 2L.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle surroundings monitoring apparatus comprising:
    an imaging device that captures a surroundings of a vehicle;
    a temperature measuring device that measures a temperature of the imaging device;
    an OFF signal output device that outputs a command signal to set a power supply of the imaging device to the OFF state in accordance with the temperature of the imaging device measured by the temperature measuring device;
    a reset determining device that determines whether or not a state of the imaging device is a specified resettable state;
    a restart device that restarts the imaging device with the power supply set to the OFF state when the state of the imaging device is determined to be a specified resettable state by the reset determining device;
    a vehicle speed measuring device that measures the speed of the vehicle; and
    a vehicle temperature state measuring device that measures a temperature state of the vehicle,
    wherein the reset determining device determines that the state of the imaging device is a specified resettable state when the speed of the vehicle measured by the vehicle speed measuring device is not less than a specified speed and the temperature state of the vehicle measured by the vehicle temperature state measuring device is not more than a specified temperature.

2. The vehicle surroundings monitoring apparatus according to claim 1, further comprising:
    an elapsed time measuring device that measures an elapsed time from a moment the command signal is output by the OFF signal output device, wherein the reset determining device determines that the state of the imaging device is a specified resettable state when when the speed of the vehicle measured by the vehicle speed measuring device is not less than a specified speed, the temperature state of the vehicle measured by the vehicle temperature state measuring device is not more than a specified temperature, and the elapsed time measured by the elapsed time measuring device is equal to or longer than a predetermined value.

* * * * *